(12) United States Patent
Silver et al.

(10) Patent No.: US 7,657,016 B2
(45) Date of Patent: *Feb. 2, 2010

(54) APPARATUS, SYSTEM AND METHOD FOR MONITORING A CALL FORWARDED TO A NETWORK-BASED VOICE MAIL SYSTEM

(75) Inventors: Edward Michael Silver, Atlanta, GA (US); Anita Hogans Simpson, Decatur, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 69 days.

This patent is subject to a terminal disclaimer.

(21) Appl. No.: 11/439,371

(22) Filed: May 23, 2006

(65) Prior Publication Data

US 2007/0041518 A1  Feb. 22, 2007

(51) Int. Cl.
*H04M 3/42* (2006.01)
(52) U.S. Cl. ............................. 379/211.02
(58) Field of Classification Search ............ 379/406.14, 379/211.02
See application file for complete search history.

(56) References Cited

U.S. PATENT DOCUMENTS

| | | | |
|---|---|---|---|
| 4,811,381 A | 3/1989 | Woo et al. ............... 379/88.19 |
| 5,243,642 A | 9/1993 | Wise | |
| 5,333,173 A | 7/1994 | Seazholtz | |
| 5,471,519 A | 11/1995 | Howe | |
| 5,548,636 A | 8/1996 | Bannister | |
| 5,590,171 A | 12/1996 | Howe | |
| 5,604,792 A | 2/1997 | Solomon | |
| 5,668,862 A | 9/1997 | Bannister et al. ....... 379/207.14 |
| 5,748,718 A | 5/1998 | Manicone | |
| 5,805,587 A | 9/1998 | Norris | |
| 5,905,774 A | 5/1999 | Tatchell | |
| 5,937,047 A | 8/1999 | Stabler | |
| 5,946,386 A | 8/1999 | Rogers | |
| 5,956,389 A | 9/1999 | Jung | |
| 5,999,611 A | 12/1999 | Tatchell et al. ......... 379/211.02 |
| 6,031,896 A | 2/2000 | Gardell | |

(Continued)

OTHER PUBLICATIONS

U.S. Appl. No. 10/255,228 entitled "Call Monitoring" filed Sep. 26, 2002.

(Continued)

Primary Examiner—Alexander Jamal
(74) Attorney, Agent, or Firm—Thomas, Kayden, Horstemeyer & Risley, LLP (57) ABSTRACT

An apparatus, system and method for monitoring calls that have been forwarded to a network-based voice mail system (VMS). The VMS receives the forwarded call and sends a start of greeting signal at the beginning and an end of greeting signal at the completion of the voice message greeting to the central office switch. The switch sends an activate call monitoring data message and a call monitoring alert signal to the customer premises equipment (CPE). If the CPE is adapted for call monitoring and includes a speaker assembly, then the speaker assembly is engaged in response to the activate call monitoring data message, thereby allowing hands-free call monitoring. If the CPE does not include a speaker assembly, then the called party may activate call monitoring by lifting the handset in response to detecting a call monitoring alert from the CPE. While monitoring the call, the called party may intercept the call to speak with the calling party.

21 Claims, 6 Drawing Sheets

U.S. PATENT DOCUMENTS

| | | | |
|---|---|---|---|
| 6,101,249 | A | 8/2000 | Weber |
| 6,144,644 | A | 11/2000 | Bajzath |
| 6,160,877 | A | 12/2000 | Tatchell |
| 6,295,341 | B1 | 9/2001 | Muller |
| 6,310,939 | B1 | 10/2001 | Varney |
| 6,337,898 | B1 | 1/2002 | Gordon |
| 6,393,122 | B1 | 5/2002 | Belzile |
| 6,411,682 | B1 | 6/2002 | Fuller |
| 6,438,222 | B1 | 8/2002 | Burg |
| 6,449,474 | B1 | 9/2002 | Mukherjee |
| 6,477,246 | B1 | 11/2002 | Dolan et al. ............ 379/211.02 |
| 6,493,431 | B1 | 12/2002 | Troen-Krasnow |
| 6,639,972 | B1 | 10/2003 | Cannon |
| 6,661,886 | B1 | 12/2003 | Huart |
| 6,714,637 | B1 | 3/2004 | Kredo |
| 6,738,461 | B2 | 5/2004 | Trandal et al. .......... 379/142.02 |
| 6,744,867 | B1 * | 6/2004 | Chin et al. ............. 379/142.01 |
| 6,751,300 | B2 | 6/2004 | Muller |
| 6,754,311 | B1 | 6/2004 | Kampmeier |
| 6,879,677 | B2 | 4/2005 | Trandal et al. .......... 379/215.01 |
| 6,898,275 | B2 | 5/2005 | Dolan et al. ........... 379/211.02 |
| 6,909,776 | B2 | 6/2005 | Holt et al. ................ 379/88.26 |
| 7,050,559 | B2 * | 5/2006 | Silver et al. ............ 379/211.02 |
| 7,158,619 | B2 | 1/2007 | Simpson .................. 379/88.22 |
| 7,245,713 | B1 | 7/2007 | Simpson et al. ......... 379/221.01 |
| 2003/0076941 | A1 | 4/2003 | Tiliks et al. ................. 379/196 |
| 2003/0108172 | A1 | 6/2003 | Petty et al. |
| 2003/0118160 | A1 | 6/2003 | Holt |
| 2003/0147511 | A1 | 8/2003 | Silver et al. |
| 2004/0141593 | A1 | 7/2004 | Simpson |
| 2004/0258220 | A1 | 12/2004 | Levine et al. |
| 2007/0165791 | A1 | 7/2007 | Simpson ..................... 379/67.1 |
| 2008/0069313 | A1 | 3/2008 | Simpson et al. .......... 379/88.12 |
| 2008/0317221 | A1 | 12/2008 | Silver |

OTHER PUBLICATIONS

U.S. Appl. No. 10/346,926 entitled "Remote Call Monitoring" filed Jan. 17, 2003.

U.S. Appl. No. 11/637,617, entitled "Remote Call Monitoring" filed Dec. 12, 2006.

U.S. Office Action dated Dec. 19, 2003 cited in U.S. Appl. No. 10/026,394.

U.S. Office Action dated Jun. 7, 2004 cited in U.S. Appl. No. 10/026,394.

U.S. Office Action dated Dec. 29, 2004 cited in U.S. Appl. No. 10/026,394.

U.S. Final Office Action dated Aug. 9, 2005 cited in U.S. Appl. No. 10/026,394.

U.S. Office Action dated Sep. 17, 2003 cited in U.S. Appl. No. 10/255,228.

U.S. Final Office Action dated Mar. 22, 2004 cited in U.S. Appl. No. 10/255,228.

U.S. Office Action dated Sep. 22, 2004 cited in U.S. Appl. No. 10/255,228.

U.S. Final Office Action dated Jun. 16, 2005 cited in U.S. Appl. No. 10/255,228.

U.S. Final Office Action dated Jun. 28, 2006 cited in U.S. Appl. No. 10/255,228.

U.S. Office Action dated Sep. 23, 2004 cited in U.S. Appl. No. 10/346,926.

U.S. Final Office Action dated Jun. 16, 2005 cited in U.S. Appl. No. 10/346,926.

U.S. Final Office Action dated Aug. 9, 2006 cited in U.S. Appl. No. 10/346,926.

U.S. Office Action dated Dec. 13, 2006 cited in U.S. Appl. No. 10/255,228.

U.S. Official Action dated Dec. 5, 2005 cited in U.S. Appl. No. 10/255,228.

U.S. Official Action dated Jan. 3, 2006 cited in U.S. Appl. No. 10/346,926.

U.S. Appl. No. 10/255,288, filed Sep. 26, 2002, Simpson, et al.

Silver; U.S. Appl. No. 10/026,394, filed Dec. 21, 2001.

Silver; U.S. Appl No. 12/107,872, filed Apr. 23, 2008.

Silver; Examiner Interview Summary mailed Aug. 9, 2004 for U.S. Appl. No. 10/026,394, filed Dec. 21, 2001.

Silver; Examiner Interview Summary mailed Oct. 12, 2005 for U.S. Appl. No. 10/026,394, filed Dec. 21, 2001.

Silver; Final Rejection mailed Aug. 9, 2005 for U.S. Appl. No. 10/026,394, filed Dec. 21, 2001.

Silver; Non-Final Rejection mailed Jun. 7, 2004 for U.S. Appl. No. 10/026,394, filed Dec. 21, 2001.

Silver; Non-Final Rejection mailed Dec. 19, 2003 for U.S. Appl. No. 10/026,394, filed Dec. 21, 2001.

Silver; Non-Final Rejection mailed Dec. 29, 2004 for U.S. Appl. No. 10/026,394, filed Dec. 21, 2001.

Silver; Notice of Allowance and Fees Due mailed Jan. 30, 2006 for U.S. Appl. No. 10/026,394, filed Dec. 21, 2001.

* cited by examiner

APPARATUS, SYSTEM AND METHOD FOR MONITORING A CALL FORWARDED TO A NETWORK-BASED VOICE MAIL SYSTEM

RELATED APPLICATIONS

This application claims priority to U.S. application Ser. No. 10/026,394 entitled "Apparatus, System and Method for Monitoring a Call Forwarded to a Network-Based Voice Mail System" filed Dec. 21, 2001, which is incorporated herein by reference.

FIELD OF THE INVENTION

The present invention relates in general to call monitoring and in particular to monitoring a call that has been forwarded to a network-based voice mail system.

BACKGROUND OF THE INVENTION

The answering machine is a great convenience to telephone users. The answering machine eliminates the need for the called party to wait by the telephone to avoid missing a telephone call. In addition, the answering machine provides the calling party with the flexibility to leave a voice message for the called party if the called party is not available to answer the call. At one time the called party was required to provide special equipment to obtain answering machine capabilities. However, special equipment is no longer required if a network-based voice mail system is used.

The standard answering machine and the network-based voice mail system are alike in their basic function of recording and storing voice messages; however, the voice mail system provides additional features not available with the standard answering machine. These features include the capability to re-record a voice message; to attach an urgent status to a message, thereby cycling the urgent message to the top of the message list; to setup multiple mailboxes to receive voice messages; to allow a caller to leave a voice message when the called party's line is busy; and to continue to receive voice messages when there is a power outage.

There is one feature, however, that the network-based voice mail system has not been able to improve. Currently, the called party is not able to easily monitor a call that has been forwarded to a network-based voice mail system. A called party with a standard answering machine is able to monitor the voice message as the calling party is leaving the voice message. The answering machine answers the call and immediately plays the called party's greeting. A record message indicator, such as a beep tone, signals the calling party to leave a message. The answering machine simultaneously records the message and engages a speaker assembly. The called party is able to monitor the call without lifting the handset If the called party elects to intercept the call during the message, the called party lifts the handset and speaks with the calling party. Once the called party lifts the handset, the answering machine stops recording and the called party can erase the partially recorded message.

Unlike the answering machine, network-based voice mail does not allow the called party to easily monitor the call as the calling party is leaving a message. One manual system that allows the calling party to monitor a call has been implemented on the Nortel DMS-100 and the Lucent 5ESS switches. This system requires the called party to detect one short ring burst in order to activate call monitoring. This short ring burst is approximately 0.5 seconds of ringing. The ringing pattern for a normal call is a repetitive two seconds ringing on, four seconds ringing off pattern. Once the short ring burst is played, the called party is required to lift the handset or go off-hook within a prescribed time limit in order to manually activate call monitoring.

There are three drawbacks of this system. The first drawback is that the called party often does not detect the short ring burst that indicates to the called party that the call monitoring service is available. Although the switch sends a short ring burst to the called party's Customer Premises Equipment (CPE), studies have shown that the short ring burst is not distinctive enough and often the called party answers the call too soon or too late.

The called party answers too soon if the called party answers the call before the call is forwarded to the voice mail system. Studies have shown that if the call is forwarded during the two-second ring, then the two-second ring is cut off. This is a normal telephony occurrence. The called party often mistakes this for the short ring burst and lifts the handset too soon. Studies have also shown that the four seconds of silence can cause the called party to believe that the prior two-second ring was the short ring burst, and so the called party lifts the handset, resulting in answering, not monitoring, the call.

The called party answers too late if the called party answers the call after the prescribed time limit The called party is not able to monitor the call after expiration of the prescribed time limit. Studies have shown that the called party sometimes interprets the short ring burst as the "tail-end" of the regular two seconds on/four seconds off ringing pattern or, simply does not "hear" the short ring burst, so the called party does not activate call monitoring.

The second drawback is that the manual system allows the called party to monitor the call prior to the playing of the record message indicator. This raises a privacy issue because the called party is able to hear anything the caller says prior to the record message indicator, even though it is not intended as a message for the called party.

The third drawback is that a call may be monitored by a party other than the intended called party, if the call, prior to being forwarded to voicemail, had been previously forwarded. For example, consider what happens when A calls B and B's calls are being forwarded to C. If C does not answer and the call is forwarded to a network based voicemail system, then C can monitor the call and hear A's message to B.

Other systems have also attempted to solve this problem by establishing a three-way connection between the calling party, the network-based voice mail system (VMS) and the called party CPE. These systems allow the called party to monitor the calling party as if the called party were a third party. This solution has a couple of problems. One problem is that the setup time to establish the connection is too long. The calling party is asked to wait a moment before leaving a message. The wait period is required to allow the system adequate time to setup a second call to the VMS, and then join the calling party, called party, and VMS in a three-way call. Additionally this solution requires the called party to purchase three way calling and a special CPE that can automatically set up three-way calling to the VMS.

Thus, there is a need for a system, method and apparatus that allows a called party to easily monitor a call that has been forwarded to a network-based voice mail system.

SUMMARY OF THE INVENTION

The present invention meets the needs described above by providing an apparatus, system and method for monitoring a call forwarded to a network-based voice mail system. The present invention provides a new automated solution for call monitoring and an improvement upon the current manual system.

There are several aspects of the invention. In one aspect of the invention, the voice mail system (VMS) sends a start of greeting (SOG) signal to the central office switch (CO) before the called party's voice message greeting is played and sends an end of greeting (EOG) signal to the CO after the called party's voice message greeting is played. The EOG signal can dually serve as the record message indicator. The switch can be provisioned to allow call monitoring when it receives either the SOG or the EOG signal.

If the switch does not receive a provisioned signal, then the CO will not allow call monitoring of the call. For example, normal call processing can result in the calling party being routed to the main voice mail announcement, instead of the calling party's personal mailbox. The calling party is prompted to leave a message for a particular mailbox or to press "*" or "#" to enter their own mailbox (e.g., to check their messages). In another example, a called party B has forwarded their calls to another party C, who has call monitoring. If party C does not answer the incoming call forwarded by party B, then there is the potential for party C to monitor a message being left for party B. In both examples, the VMS will not send a provisioned signal, so the CO will not allow call monitoring.

The VMS also sends a deny call monitoring (DCM) signal to block or to stop call monitoring. The DCM signal is sent from the voice mail system (VMS) to the CO while call monitoring is active and when the calling party exits the called party's mailbox to access other VMS functions. The CO receives the signal and disconnects the called party. Additionally, the VMS can send the DCM signal to the CO at other times when call monitoring should not be allowed.

In another aspect of the invention, the CO receives a signal from the VMS that indicates to the switch when to allow call monitoring. The CO responds to the signal by sending a call monitoring alert signal and an activate call monitoring data message to the customer premises equipment (CPE). The call monitoring alert signal can be used to alert the called party that call monitoring is available and the activate call monitoring data message can be used to begin automated call monitoring. The alert signal causes distinctive ringing to be applied to the called party's line. The distinctive ring pattern is very different than regular ringing and therefore, will be discernable by the called party.

The CO also receives signals from the CPE when the called party intercepts a call. In response to receiving the intercept signals, the CO connects the calling party to the called party. Today the CO detects the switch-hook flash from the called party and uses it as the signal to connect the calling and called parties. Alternatively, the CO could have a Tone Receiver connected to the called party's line so that different user or CPE generated call monitoring intercept tones (or sequences) could be used to provide different connection options such as:
  Connect calling party and called party, disconnect voice mail.
  Connect calling party and called party, delete the voice mail message, then disconnect voice mail.
  Connect calling party and called party, continue to record message (keep voice mail in the call).

In another aspect of the invention, the CPE receives the call monitoring alert signal and the activate call monitoring data message. The CPE can be a conventional CPE or a special CPE, where a special CPE is a CPE especially adapted for call monitoring. In response to receiving the call monitoring alert signal, the CPE provides an alert to the called party that indicates to the called party that call monitoring is available. The alert can be a distinctive ring, a visual indicator or another type of alert. The called party responds to the alert (e.g. lifts the handset) to activate manual call monitoring.

Additionally, the CO can augment the distinctive ring with a call monitoring data message using for example, in-band TR-30 signaling or Integrated Service Digital Network (ISDN) signaling. In response to the alert signal or the activate call monitoring data message, a special CPE activates call monitoring by automatically going off-hook and activating its speaker in muted mode. This allows the called party to have hands-free call monitoring.

In another aspect of the invention, multiple special CPE's are connected to the line associated with the called party. Every CPE on the line responds to the receipt of the alert signal and the activate call monitoring data message from the CO. The called party intercepts the call by entering a call monitoring intercept tone. The call monitoring intercept tone can be programmed as a feature button on the special CPE, or can be user entered Touch-Tone(s). If the called party elects to intercept the call, then the CPE that the called party uses to intercept the call sends a call monitoring intercept tone which is detected by the CO, as well as all special CPEs on the line. The CO connects the calling party to the called party in accordance with the tone received. All other special CPEs on the line hang up.

These and other aspects, features and advantages of the present invention may be more clearly understood and appreciated from a review of the following detailed description of the disclosed embodiments and by reference to the appended drawings and claims.

DETAILED DESCRIPTION OF THE INVENTION

The present invention is directed to an apparatus, system and method for monitoring a call forwarded to a network-based voice mail system. Briefly described the present invention provides a voice mail system (VMS) that sends call monitoring signals to a central office switch (CO) upon receiving a forwarded call. The signals include a start of greeting (SOG) signal and an end of greeting (EOG) signal. The switch is provisioned so that one of these signals is recognized as an indicator that call monitoring can begin. Once the switch receives the indication that call monitoring can begin, the switch sends a call monitoring alert signal and an activate call monitoring data message to customer premises equipment (CPE) associated with a called party number. The call monitoring alert signal and the activate call monitoring data message indicate that call monitoring is available. Once call monitoring is available, the called party can monitor the call via a special CPE or a conventional CPE. The called party can intercept the call while it is being monitored.

Exemplary Operating Environment

Figure 1:
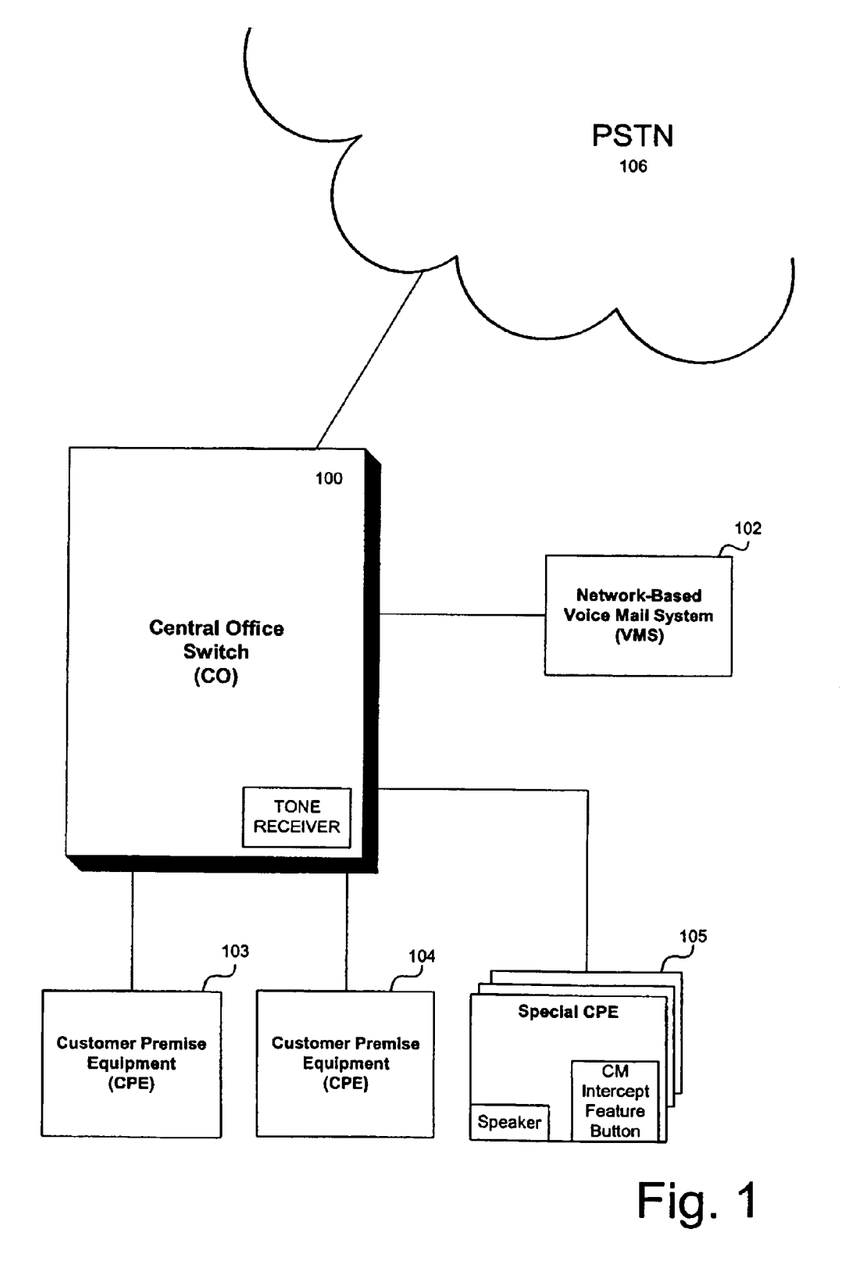
FIG. 1 is a block diagram illustrating the connection between a central office switch, a network-based voice mail system and customer premises equipment, in accordance with an exemplary embodiment of the invention.

FIG. 1 illustrates an exemplary operating environment for an embodiment of the present invention. FIG. 1 includes a representative portion of the public switched telephone network (PSTN) that includes a central office switch (CO) 100, a network based voice mail system (VMS) 102, Customer premises Equipment (CPE) 103, 104, 105 and the remaining portion of the PSTN 106.

FIG. 1 includes a CO. The existing CO-based call monitoring service uses switch-based call forwarding to forward a call to voice mail. When the VMS answers, the CO rings the called party's line by providing the short ring burst as a call monitoring alert signal to the called party. If the called party answers the short ring burst, the CO sets up a conference circuit to the called party for monitoring the calling party's voice message. If the called party switch-hook flashes, then the CO provides a talking connection between the calling and called parties. The CO allows call monitoring when the VMS answers a call. Some CO vendors restrict call monitoring when the call to the VMS was previously forwarded from party B to party C, and then party C forwards the call to voice mail.

FIG. 1 also includes a VMS. Generally, a VMS records, stores, retrieves and performs other functions related to voice mail messages that are left by callers for a particular subscriber. A VMS typically includes a voice mailbox for each subscriber.

In addition, FIG. 1 includes CPE's 103, 104 and 105. CPE 103 is a conventional CPE at the calling party's premises. CPE 104 is a conventional CPE at the called party's premises. CPE 105 is a special CPE at the called party's premises that provides automated call monitoring. CPE 105 is capable of automatically enabling/disabling its speaker, going on-hook/off-hook and generating/detecting a call monitoring intercept tone. The CPE's include telephones, facsimile machines, modems and any other type of equipment that can be connected to the PSTN.

As will be apparent to those skilled in the art, the PSTN includes many other components and configurations, other than those shown in FIG. 1. However, for simplicity, only those components necessary for an explanation of the present invention are included in FIG. 1.

Call Monitoring Service

To monitor a call forwarded to a network-based VMS, the VMS provides signals to the CO to indicate when call monitoring may begin. Call monitoring can be performed by a called party using a special CPE or a conventional CPE. A special CPE is a CPE that has a speaker assembly and that is capable of enabling the speaker assembly, in muted mode, in response to an activate call monitoring data message from the CO. The special CPE can also include other features that are specially adapted for call monitoring, including a call monitoring alert indicator, such as a light, or a special intercept key.

FIG. 1 shows that there can be a single CPE or multiple CPE's associated with a called party's line. A call to a called party associated with CPE 104 is initiated by a caller using CPE 103. The call is received by the CO 100 and the CO routes the call to CPE 104. If the called party does not answer the call and the called party subscribes to voice mail, then the CO 100 routes the call to the VMS 102. The VMS 102 sends a SOG signal to the CO when the VMS begins to play the subscriber's voice message greeting to the called party. Once the voice message greeting ends, the VMS sends an EOG signal to the CO. The CO can be provisioned to start call monitoring upon receipt of either the SOG or the EOG signal.

Once the CO starts call monitoring, the CO 100 sends a call monitoring alert signal to the called party's CPE. The call monitoring alert signal is used to alert the called party that call monitoring is available. The alert signal is a distinctive ring pattern that is generated by all CPEs 104 and 105. The CO 100 can be provisioned to augment the distinctive ring pattern with an activate call monitoring data message. The activate call monitoring data message is sent to the called party's CPE along with the call monitoring alert signal.

If CPE 105 is available, CPE 105 begins automated call monitoring when the activate call monitoring data message is received. It will be apparent to those skilled in the art that the distinctive ring pattern is unique so that CPE vendors could decide to use this distinctive ring as a signal to begin automated call monitoring. Similarly, the activate call monitoring data message could be used by CPE 105 to provide unique call monitoring features that would make it a more competitive product such as displaying a text indicator, light indicator, or replacing the CO generated distinctive ring with a even more unique ring/sound which may be subscriber selectable.

If CPE 105 is not available, then the called party hears the distinctive ring pattern and must intervene (e.g. by lifting the handset) to cause the CPE 104 to go off-hook, thus allowing the called party to monitor the call using CPE 104.

The called party can intercept a call after call monitoring has begun. To intercept a call using a special CPE, the called party lifts the handset or depresses a predetermined key or key sequence. Lifting the handset is an intercept indicator to the CPE that the called party is intercepting the call. To intercept a call using a conventional CPE, the called party uses the switch hook or a predetermined key or key sequence to send an intercept indicator to a special CPE to intercept the call. In either case, the CPE sends an intercept tone to the CO in response to receiving the intercept indicator.

If there are multiple CPE's, the CPE used to intercept the call sends a call monitoring intercept tone. The call monitoring intercept tone may serve the dual role of providing the on-hook signal to the other CPE 105 on the line and of sending an intercept tone to the CO.

Once the CO receives the intercept tone, the CO connects the called party to the calling party. Once the called party and the calling party are connected, the CO either disconnects the VMS or maintains the VMS connection depending up the call monitoring intercept tone received. Different user or CPE generated call monitoring intercept tones (or sequences) could be used to provide different connection options, such as:

Connect calling party and called party, disconnect voice mail.

Connect calling party and called party, delete the voice mail message, then disconnect voice mail.

Connect calling party and called party, continue to record message (keep voice mail in the call).

Another option is to program the CO to maintain the VMS connection for a predetermined number of seconds once an intercept tone is received. During this time the called party can enter a voice mail code, typically a dual tone multi-frequency (DTMF) sequence defined by the VMS, using the CPE to indicate how the voice message should be handled. For example, the called party could indicate that the voice message should be erased or saved. If the VMS receives a voice mail code before the CO disconnects the VMS, then the VMS performs the function indicated by the voice mail code. Alternatively, the CO can be provisioned to disconnect the VMS once the call is intercepted or to maintain the VMS connection until the parties hang up.

Exemplary Methods For Call Monitoring

FIGS. 2A, 2B, 3, 4A and 4B are flow diagrams illustrating the function of each component in an exemplary system for call monitoring.

Figure 2A:
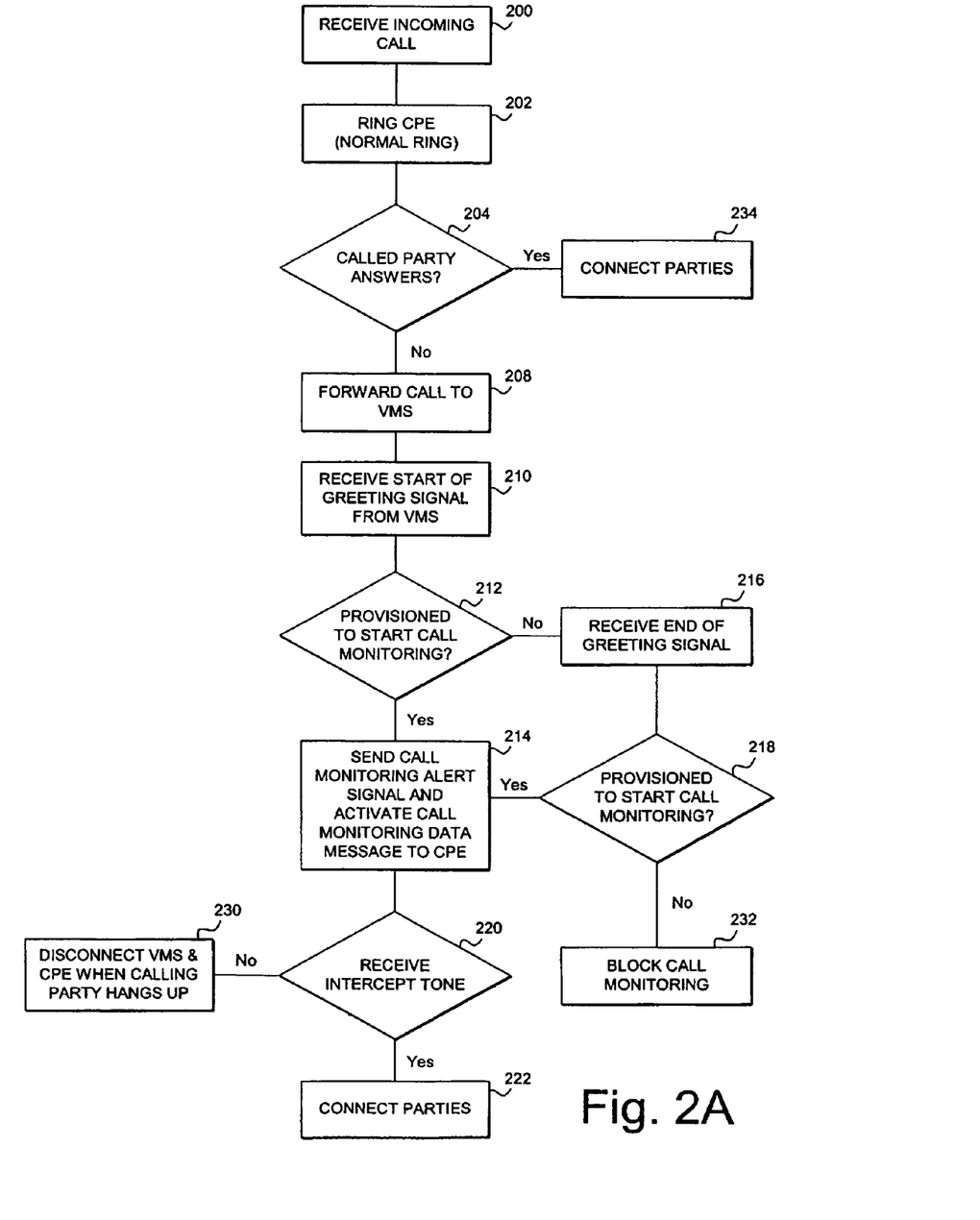
FIGS. 2A, 2B are flow diagrams illustrating an exemplary method of the central office switch (CO), in accordance with an embodiment of the invention.
Figure 2B:
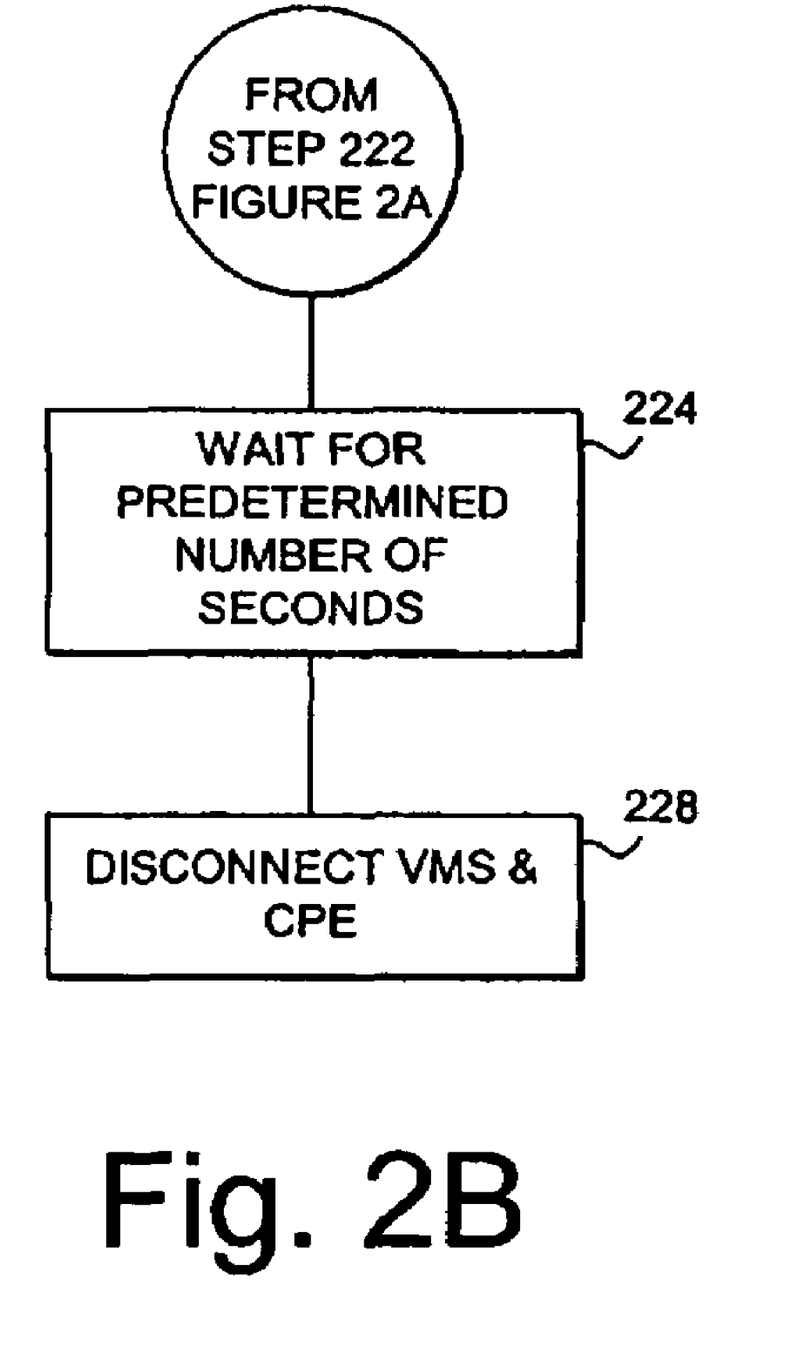

FIGS. 2A and 2B illustrate the functions of the CO in which the CO is provisioned to start call monitoring upon receiving either a start of greeting (SOG) or an end of greeting (EOG) signal from the VMS. An incoming call is received at a CO associated with a called party in step 200. The CO provides a normal ring tone to the CPE in step 202. If the called party does not answer the call in step 204 then the method proceeds along the No branch to step 208. In step 208, the CO forwards the unanswered call to the voice mail system (VMS). In step 210 the CO receives a start of greeting (SOG) signal from the VMS. In step 212 there is a determination as to whether the CO is provisioned to allow call monitoring upon receipt of the SOG signal. If the CO is provisioned to allow call monitoring in response to receiving the SOG signal, then the method proceeds along the Yes branch to step 214.

If the CO is not provisioned to allow call monitoring upon receiving the SOG signal in step 212, then the method proceeds along the No branch to step 216. In step 216, the CO receives an end of greeting (BOG) signal from the VMS. In step 218 there is a determination made as to whether the CO is provisioned to allow call monitoring upon receipt of an BOG signal. If the CO is provisioned to allow call monitoring upon receipt of the BOG signal, then the method proceeds along the Yes branch to step 214. Although not shown in FIG. 2A, a CO provisioned to allow call monitoring upon receipt of the SOG signal, can also receive the EOG signal.

In response to receiving either a provisioned SOG or BOG signal, the CO, in step 214, sends a call monitoring alert signal and an activate call monitoring data message to customer premises equipment (CPE) associated with the called party.

The called party can intercept a call after call monitoring has begun. In step 220, a determination is made as to whether the CO receives an intercept tone from the CPE. In some embodiments, multiple intercept codes are provided that allow for different voice mail options upon intercept. The intercept tone then not only indicates interception, but also indicates voice mail options. If an intercept tone is received, the method proceeds along the Yes branch to step 222. In step 222, the CO connects the calling party with the called party based on the intercept tone received.

One provisioning option is illustrated in FIG. 2B. In this option, the CO is provisioned to maintain the VMS connection for a predetermined number of seconds after the parties are connected. During this time the called party can enter a voice mail code to indicate how the voice message should be handled. In step 224, the CO waits a predetermined number of seconds and subsequently disconnects the VMS and CPE in step 228. Although not shown in FIG. 2B other provisioning options are available. For example, the CO can be provisioned to disconnect the VMS once the call is intercepted or to maintain the VMS connection until the parties hang up. For either of these options, the voice message typically is saved on the VMS.

If an intercept tone is not received at step 220, then the method proceeds along the No branch to step 230. In step 230, the CO disconnects the VMS and CPE when it detects that the calling party's CPE has gone on-hook.

If the CO does not receive a provisioned SOG signal in step 212 or a provisioned EOG signal in step 218, then the method proceeds along the No branch to step 232 and the CO does not allow call monitoring. If the called party answers the incoming call in step 204, then the method proceeds along the Yes branch and the called party speaks with the calling party and thus call monitoring is not applicable.

Figure 3:
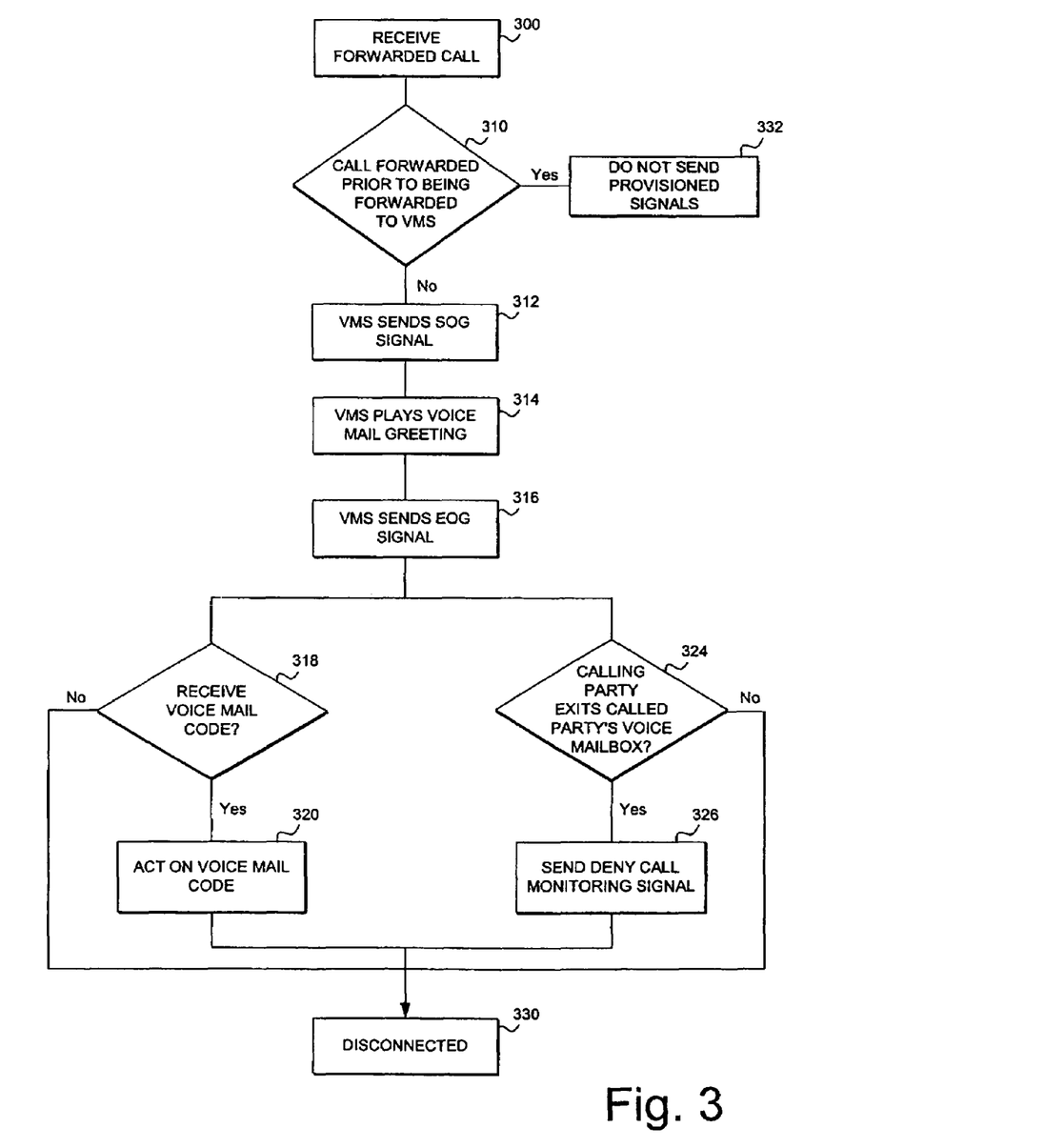
FIG. 3 is a flow diagram illustrating an exemplary method of a voice mail system (VMS), in accordance with an embodiment of the invention.

FIG. 3 illustrates the function of the voice mail system (VMS) in an exemplary call monitoring system. The VMS receives a forwarded call from the CO in step 300. A determination is made in step 310 as to whether the call was forwarded, prior to being forwarded to the VMS. If the call was not previously forwarded, then the method proceeds along the No branch to step 312 where the VMS sends a start of greeting (SOG) signal to the CO. The VMS, in step 314, plays the called party's voice mail greeting. Although in FIG. 3, these actions are shown in series, the VMS can send the SOG signal simultaneously with the playing of the voice mail greeting. Upon completion of the voice mail greeting, the VMS in step 316, sends an end of greeting (EOG) signal to the CO. The EOG signal is sent about the time that the record message indicator is played. Alternatively, the EOG signal can act as the voice message indicator, as well.

The VMS then begins recording the calling party's voice message. In addition, the VMS monitors the system for receipt of a voice mail code. The voice mail code contains a command that instructs the VMS as to how to handle the voice message. A command can be a command to erase or to save the voice message. If the VMS receives a voicemail code in step 318, then the VMS acts on the voicemail code in step 320.

The VMS also monitors the system to detect if the calling party exits the called party's voice mailbox. This is illustrated in steps 324 and 326. If the calling party exits the called party's voice mailbox in step 324, then the VMS sends a deny call monitoring signal to the CO in step 326. Additionally, this signal commands the CO to block or stop call monitoring when an event occurs that indicates to the VMS that call monitoring should be denied. The VMS is disconnected in step 330.

The VMS will not send a provisioned signal if the calling party was previously forwarded, prior to being forwarded to voice mail, the caller reaches the main mailbox greeting, or the caller decides to access another voice mailbox. The situation where the calling party was previously forwarded is illustrated in FIG. 3. If the determination in step 310 is that the call was previously forwarded, then the Yes branch is followed to step 332 and no provisioned signals are sent to the CO.

In an alternative embodiment, the call monitoring service can be VMS-based rather than switch-based. In this embodiment, the VMS provides some of the functions of the switch described above in connection with FIG. 2A. In the VMS-based call monitoring service, the VMS receives the forwarded call and determines if the call can be monitored. If the call can be monitored, then the VMS sends the activate call monitoring message to the CPE. Optionally, the VMS also causes the CO to ring the called party's CPE with a distinctive ring to alert the called party that call monitoring is available. The VMS could start call monitoring before or after the voice message greeting and could deny call monitoring if the VMS determined that call monitoring should not occur. The VMS would record the voice message and wait to receive an intercept tone. Upon receipt of the intercept tone, the VMS would act accordingly depending upon the intercept tone received, causing the parties to be connected and saving or erasing the voice message as instructed.

Figure 4A:
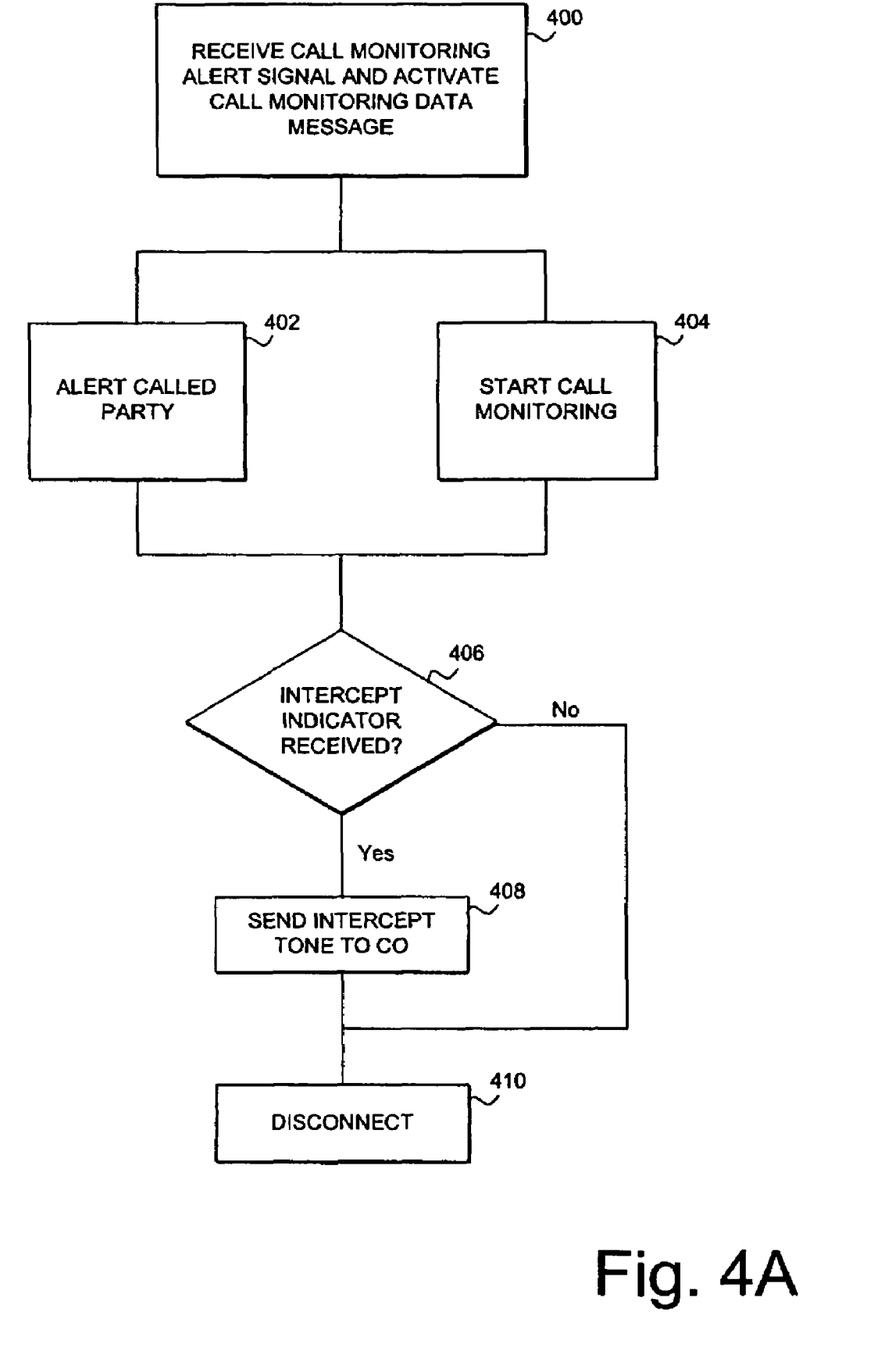
FIGS. 4A and 4B are flow diagrams illustrating an exemplary method of a special customer premises equipment (CPE) and a conventional CPE, in accordance with an embodiment of the invention.
Figure 4B:
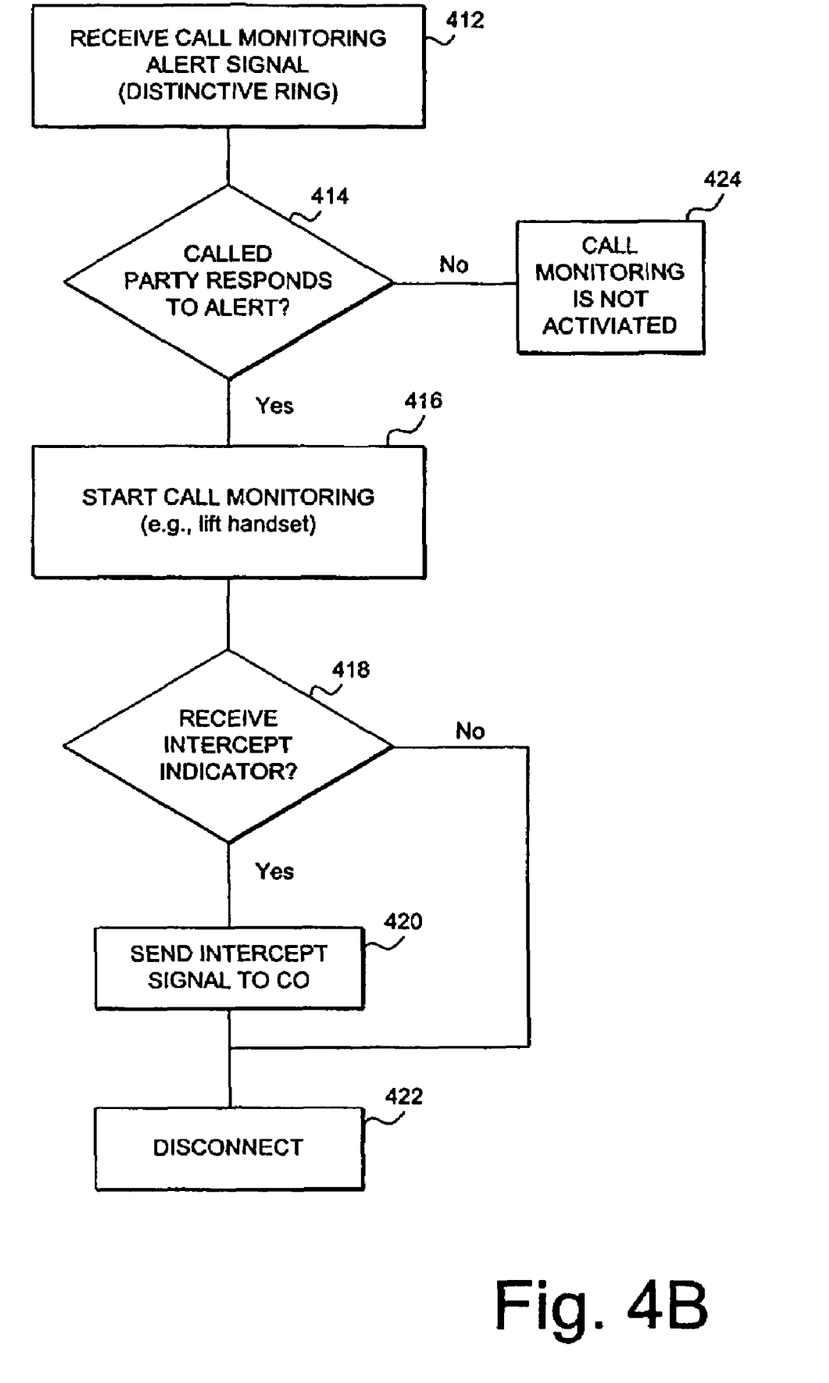

FIGS. 4A and 4B illustrate the function of a special CPE and a conventional CPE as a component of an exemplary call monitoring system, respectively. A special CPE is a CPE that can automatically enable/disable a speaker assembly, go on-hook/off-hook, generate an intercept tone and receive call monitoring data messages.

In step 400, the special CPE receives a call monitoring alert signal and an activate call monitoring data message from the CO. The call monitoring alert signal is used by the CPE, in step 402, to alert the called party that call monitoring is available. The alert may be an audio alert, such as a distinctive ring pattern, or a visual alert, such as a light on the CPE. The activate call monitoring data message can be implemented as an in-band TR-30 signaling or Integrated Service Digital Network (ISDN) signaling message. In response to receiving the activate call monitoring data message, the special CPE enables call monitoring in step 404 by going off-hook and engaging a speaker assembly in muted mode, thereby allowing the called party to monitor the call without lifting the handset.

A determination is made in step 406 as to whether the CPE receives an intercept indicator from the called party. An intercept indicator can be generated by lifting the handset of a special CPE. In response to receiving an intercept indicator in step 406, the method proceeds along the Yes branch to step 408 where the CPE sends an intercept tone to the CO. In some embodiments, the called party can enter a voice mail code after intercepting the call. If so, the voice mail code is sent to the VMS. Alternatively, if multiple intercept codes are provided that allow for different voice mail options upon intercept, then the intercept tone indicates not only interception, but also voice mail options. If an intercept indicator is not received in step 406, then the CPE stays connected until the CO disconnects the CPE in step 410.

If a special CPE is not available, then FIG. 4B illustrates the method and function of a conventional CPE. The conventional CPE receives a distinctive ring pattern or call monitoring alert signal from the CO in step 412. The distinctive ring pattern is distinct from the normal ring cycle. In step 414, a determination is made as to whether the called party has responded to the alert. The called party must respond to the alert within a prescribed time limit, in order to monitor the call. Typically, the called party responds by causing the CPE to go off-hook by lifting the handset or depressing a speaker button on the CPE. If the called party responds to the alert, then the Yes branch is followed to step 416.

In step 418, the determination is made as to whether the CPE receives an intercept indicator from the called party. The called party can intercept the call using a conventional CPE by depressing the switch-hook button. Other ways to intercept the call include using a predetermined key or key sequence or a voice activation feature, whereby the call is intercepted once the called party stats to speak.

If the called party intercepts the call in step 418, then the Yes branch is followed to step 420 and the CPE sends an intercept tone to the CO. The CPE stays connected until the CO disconnects the CPE in step 422.

If the CPE does not receive an intercept indicator in step 418, then the method proceeds along the No branch to step 422. In step 422, the CPE stays connected until the switch disconnects the CPE. If the called party does not respond to the alert in step 414, then the method proceeds along the No branch to step 424 and call monitoring is not activated.

Additional alternative embodiments will be apparent to those skilled in the art to which the present invention pertains without departing from its spirit and scope. Accordingly, the scope of the present invention is described by the appended claims and is supported by the foregoing description.

What is claimed is:

1. A system for monitoring a call forwarded to a network-based voice mail system (VMS), comprising:
   means for receiving a call directed to a called party;
   means for forwarding the call to the VMS if the call is not answered;
   means for receiving a call monitoring provisioned signal from the VMS, wherein the call monitoring provisioned signal indicates that call monitoring is allowed;
   in response to receiving the call monitoring provisioned signal, means for sending a message to a customer premises equipment (CPE) associated with the called party to alert the called party that call monitoring is available; and
   if the call was forwarded prior to being forwarded to the VMS, means for denying call monitoring.

2. The system of claim 1, wherein the VMS is operative to:
   determine if a calling party exits the VMS; and
   if the calling party exits the VMS, then send a deny call monitoring signal to a central office switch.

3. The system of claim 1, wherein the call monitoring provisioned signal is a start of greeting signal sent by the VMS when the VMS plays a called party's voice mail greeting.

4. The system of claim 1, wherein the call monitoring provisioned signal is an end of greeting signal sent by the VMS upon the completion of a called party's voice mail greeting.

5. The system of claim 4, wherein the end of greeting signal also acts as a record message indicator.

6. The system of claim 1, wherein the CPE associated with the called party is operative to generate an alert to the called party in response to receiving the call monitoring alert signal.

7. The system of claim 6, wherein the alert comprises a distinctive sound generated by the CPE associated with the called party.

8. The system of claim 6, wherein the alert comprises a visual indicator on the CPE associated with the called party.

9. The system of claim 1, wherein the CPE associated with the called party is operative to go off-hook and to activate a speaker assembly in response to receiving the activate call monitoring data message.

10. The system of claim 1, wherein the CPE associated with the called party is operative to send an on-hook signal to a second CPE and an intercept tone to a central office switch, if the CPE associated with the called party number receives an intercept indicator, further comprising:
    the second CPE connected to the central office switch and the CPE associated with the called party, the second CPE operative to go on-hook in response to receiving the on-hook signal.

11. The system of claim 10, wherein the intercept tone is a Dual-Tone Multi Frequency (DTMF) signal.

12. The system of claim 10, wherein one signal has the dual function of indicating on-hook to the second CPE and indicating interception to the central office switch.

13. A method for monitoring a call forwarded to a network based voice mail system comprising:
   receiving a call from a calling party directed to a telephone number associated with a called party;
   forwarding the call to the voice mail system when the call is not answered;
   after forwarding the call to the voice mail system, determining whether the call was forwarded prior to being forwarded to the voice mail system;

sending a call monitoring alert signal and an activate call monitoring message to customer premises equipment (CPE) associated with the called party to alert the called party that call monitoring is available if the call was not forwarded prior to being forwarded to the voice mail system;

receiving a request to monitor the call; and causing the CPE associated with the called party to be connected to the calling party.

14. The method of claim 13, further comprising:

detecting a voice mail code sent by the called party; and acting on the voice mail code.

15. The method of claim 14, wherein the voice mail code is a Dual Tone Multi-Frequency (DTMF) sequence.

16. The method of claim 13, further comprising:

after sending a call monitoring alert signal and an activate call monitoring message, connecting the voice mail system with the CPE associated with the called party to allow call monitoring;

after connecting the voice mail system with the CPE associated with the called party, receiving an intercept tone from the CPE; and in response to receiving the intercept tone, causing the CPE associated with the called party to be connected to the calling party.

17. The method of claim 16, wherein the intercept tone is a Dual Tone Multi Frequency (DTMF) tone.

18. A method for monitoring a call forwarded to a network based voice mail system (VMS) comprising:

receiving a call from a calling party;

forwarding the call to the VMS;

after forwarding the call to the VMS, receiving a call monitoring provisioned signal from the VMS indicating that call monitoring is allowed; and sending a call monitoring alert signal and an activate call monitoring data message to customer premises equipment (CPE) associated with the called party in response to receiving the call monitoring provisioned signal from the VMS.

19. The method of claim 18, further comprising:

playing a voice message greeting;

sending a start of greeting signal from the VMS to a central office switch upon receipt of the start of greeting signal.

20. The method of claim 19, further comprising:

sending an end of greeting signal upon completion of the voice message greeting from the VMS to the central office switch upon receipt of the end of greeting signal.

21. The method of claim 18, further comprising:

receiving a voice mail code associated with a voice mail function; and performing the voice mail function in response to receiving the voice mail code.

* * * * *